June 4, 1946.   A. G. M. MICHELL   2,401,433
CRANKLESS MECHANISM
Filed Sept. 27, 1944
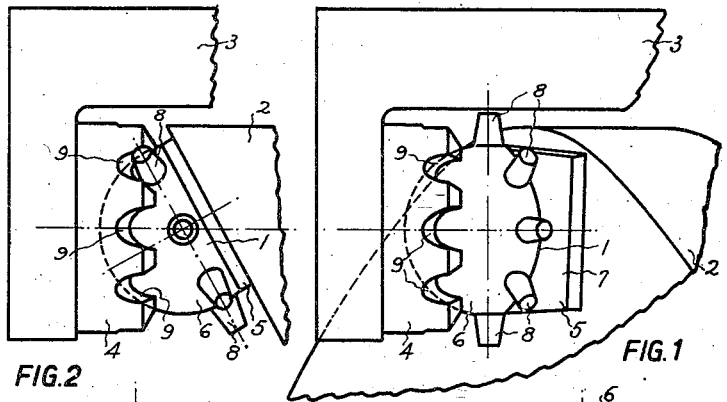
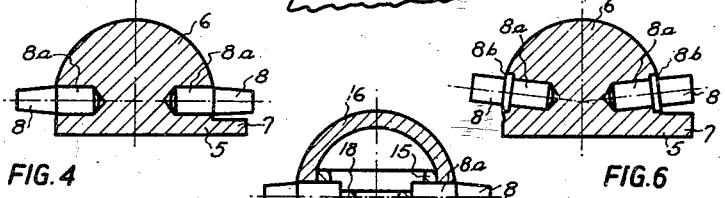
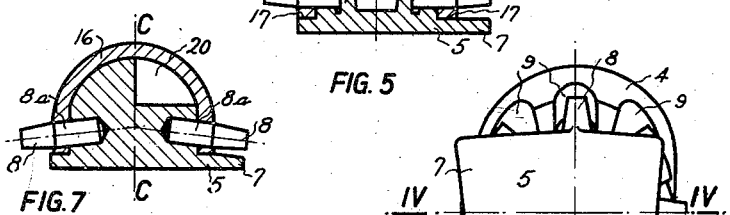
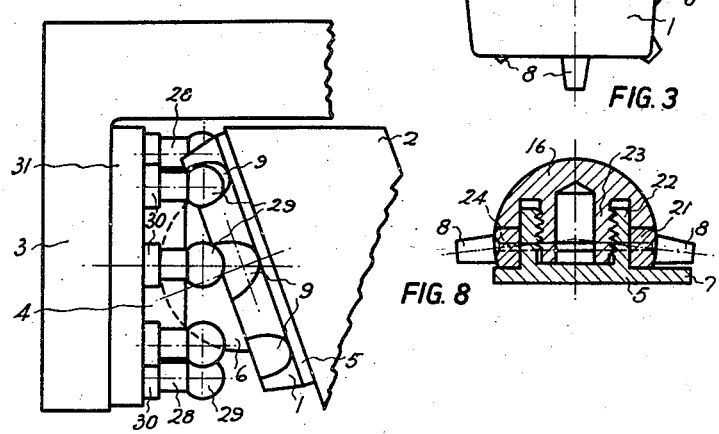
INVENTOR
ANTHONY GEORGE MALDON MICHELL
BY
ATTORNEY Patented June 4, 1946

2,401,433

UNITED STATES PATENT OFFICE 2,401,433

CRANKLESS MECHANISM

Anthony George Maldon Michell, Melbourne, Victoria, Australia

Application September 27, 1944, Serial No. 555,980
In Australia November 20, 1943

6 Claims. (Cl. 74—60)

This invention relates to improvements in the elements which serve to make working contact between the rotating member, or slant, and the reciprocating elements of crankless machines such as are described, for example, in the prior Patents 1,409,057 and 1,729,448.

The elements used for this purpose according to the known construction are a slipper making sliding contact with the slant and a socket, or cup, attached rigidly to the reciprocating member, in which the slipper is universally mounted, as by a ball-joint. In order to effect wedge-film lubrication between the slant and the slipper, the slipper is mounted unsymmetrically in the socket according to well known principles. It is consequently necessary to prevent the slipper from rotating about the axis of the socket, and this has hitherto been usually effected by providing the slipper with a pin, or other projection, engaging in a longitudinal slot formed in the yoke or other part of the reciprocating member. This construction is however apt to be, in itself, deficient in strength and durability, and the formation of the slot tends to weaken a part of the reciprocating member in which the greatest attainable strength and rigidity are required.

According to the present invention, an annular series of suitably shaped projections is formed upon, or attached to, the slipper, these projections engaging in sequence with an equal number of recesses provided circumferentially in the socket itself, or in a part of the reciprocating member adjacent thereto. Vice versa, the projections may be upon the socket, or other part of the reciprocating member, and the corresponding recesses in the slipper.

It being sometimes desirable, for reasons hereinafter mentioned, to form the slipper of two separate parts rigidly connected together, it is a secondary purpose of the invention to employ the said "projections" attached to the slipper for making this connection. Similarly, when the said "projections" are attached to the socket, they may be used to make the necessary connection of the socket to the reciprocating member, besides serving their primary purpose of preventing rotation of the slipper.

In the accompanying drawing—

Figs. 1 and 2 are side views, projected on a plane parallel to the line of reciprocation, of a slipper and socket embodying the invention, and show the positions of the slipper in relation to the socket and to the slant respectively at the middle, and at one end, of the stroke of the reciprocating unit.

Fig. 3 is a view of the slipper and socket in the positions shown in Fig. 2, taken from the side towards the slant, and projected on the plane of the latter.

Fig. 4 is a section of a slipper on line IV—IV of Fig. 3.

Figs. 5, 6 and 7 are sections of modified forms of the slipper shown in Figs. 1 to 4.

Fig. 8 shows by a view corresponding to either of the Figs. 4 to 7 an alternative mode of construction of the slipper.

Fig. 9 illustrates by a view corresponding to Fig. 2 an alternative construction in which the projections are attached to the socket instead of to the slipper.

As shown in Figs. 1 to 3, the slipper 1, which serves to make operative contact between the rotating slant 2 and the reciprocating member 3, through the socket 4, rigidly attached to the member 3, consists primarily, as is usual in the crankless type of engine, of an approximately rectangular plate 5 making sliding contact with the slant, and of a spherical segment 6, hereinafter called "ball," fitting a spherical recess in the socket 4 and having a qua-qua-versally articulated movement therein. According to the form of the invention shown in Figs. 1 to 5, the slipper 1 is provided with a series of projections 8, having the shape of conical frusta projecting from the ball 6 and arranged around it in an annular series parallel to the operative face of the plate 5. The socket 4 is formed with a circumferential series of recesses 9, into one or other of which each of the projections 8 enters in turn during the qua-qua-versal movement of the ball. The number of recesses 9 is equal to that of the projections 8, so that each of the projections enters the same recess in each cycle of the movement. The slipper is thus prevented from rotating about the axis of the socket, and the offset portion 7 of the plate 5 is always presented in the same direction with respect to the circumferential movement of the slant 2. This arrangement also holds the slipper in a fixed position on the reciprocating member 3 and prevents it from moving in the direction of the rotation of the slant 2. The recesses 9 are so shaped that the entry of each projection into the corresponding recess takes place tangentially to the mutually engaging surfaces, and the shape and number of the projections and recesses is such that at least two of the projections are in engagement with the surfaces of their corresponding recesses at all phases of the cycle, one on the side of a recess in the direction of movement of the slant and one on the reverse side of the other recess.

When lightness of weight is not of importance, the plate 5 and ball 6 of the slipper may be formed, as shown in Fig. 4, of one piece of material, preferably, in most instances, steel, the operative face of the plate being then coated with anti-friction metal and the surface of the ball hardened. The projections 8, which are also preferably formed of steel and hardened, have cylindrical shank portions 8a, which are driven or shrunk into holes drilled in the ball 6 before the latter is hardened, and projecting portions in the shape of conical frusta as hereinbefore indicated. On account of this conical shape the contact pressures between the surfaces of the pins and the sides of the recesses 9 serve to prevent the projections from working out of the ball.

When lightness of the slipper is of importance, or when it is desired for any reason to make the plate and ball of the slipper of different materials, the modified construction shown in Fig. 5 may be employed. According to this construction the ball 16 is hollowed out so as to fit tightly on a cylindrical rim 15 formed on the side of the plate 5 opposite to its operative face. A face 17 is also formed on this side of the plate 5, upon which the lower edge of the hollow ball 16 is forced while the holes for the shanks 8a of the projections, which extend through both the ball and the rim 15, are being drilled. It will be seen that the shanks of the projections 8, which have the same form as shown in Fig. 4, serve to hold the plate 5 and the ball 16 firmly together. In order to ensure that the projections are entered to the correct, and equal, depths in the slipper, a second rim 18 may be formed on the plate with which the inner ends of the projections make contact as shown.

In Figs. 4 and 5, as well as in Figs. 1 to 3, the projections 8 are shown as having their axes in a diametral plane of the ball 6 parallel to the operative face of the plate 5.

It is sometimes desirable, as, for instance, to enable the offset portion 7 of the plate 5 to be of greater thickness and strength, to arrange the axes of the projections on an obtuse cone, as shown in Fig. 6, whose axis is normal to, and vertex directed towards, the operative surface of the plate. The form of the recesses of the socket must, of course, be correspondingly modified. Fig. 6 shows also projections 8 of a form alternative to that shown in the preceding figures, these being formed with collars 8b, which fit into recesses provided in the ball. The outer surface of the collar is of the same spherical radius as the surface of the ball, and is flush with the latter surface when the projection is in position. In operation, the spherical outer surfaces of the collars make contact with the concave spherical surface of the socket 4 adjacent to the recesses 9, these surfaces serving the same purpose as the conicity of the outer ends of the projections 8 hereinbefore described in preventing the projections from moving outwards from the slipper.

Other optional forms of the slipper are shown in Figs. 7 and 8. In both of these forms, as in Fig. 6, the axes of the projections 8 lie on the surface of a cone but in Figs. 7 and 8 the vertex of the cone is directed away from the operative surface of the plate 5, not towards it as in Fig. 6, thus enabling the surface of contact of the ball and socket to extend over a larger segment of the sphere. Fig. 7 also illustrates a method of utilising a two-part construction of the slipper to effect the dynamical balance of the slipper which was the special purpose of the Patent 1,729,448 hereinbefore cited. For this purpose the plate portion 5 of the slipper, which is fitted into a hollow ball 16 and secured thereto by the shanks 8a of the projections 8, in a manner similar to that already described in connection with Fig. 5, fills substantially the whole interior of the ball 16 except for the omission of a segment 20 whose position and size are such that its absence compensates, as regards balance, for the existence of the offset portion 7 of the plate 5, and enables the centre of gravity of the completed slipper to be in the same plane CC as the geometrical centre of the ball.

Fig. 8 illustrates a form of construction in which the projections 8 are formed integrally with, or are rigidly attached to, a ring 21, instead of being inserted separately into the slipper as hereinbefore described. The operative portions of the projections 8 have a similar form and make contact with the surfaces of the recesses of the socket in the same way as already described in connection with either of the preceding figures. The ring 21, carrying the projections 8, has a cylindrical inner surface which fits over a cylindrical rim 22 formed on the plate member 5 of the slipper, and a spherical outer surface which is preferably continuous with the spherical surface of the ball member 16 of the slipper. The rim 22 of the plate, and a similar internal rim 23, formed on the interior of the ball member 16, are formed with matching screw threads, as shown in the figure, and when these are screwed together the ring 21, with its attached projections 8, is firmly clamped between the ball 16 and plate 5. To prevent unscrewing of the parts, and to ensure that the projections 8 are correctly oriented with respect to the offset portion 7 of the plate, a pin 24 may be inserted in a hole drilled through all three members of the slipper, as shown.

In the alternative mode of application of the invention which is illustrated in Fig. 9, the slipper 1 with plate portion 5 and ball 6, and the socket 4 make operative engagement between the slant 2 and reciprocating member 3 in the same way as hereinbefore indicated in connection with Figs. 1, 2 and 3. According to the construction shown in Fig. 9, however, the projections 28 are attached to the socket, and the recesses with which they engage, in order to prevent rotation of the slipper about the axis of the socket, are formed in the slipper 1. The parts 29 of the projections 28 which make engagement with the recesses 9 are preferably of spherical form, as shown. The shank parts 30 of the projections 28 are rigidly inserted in a flange 31 of the socket 4 and may extend through it into the reciprocating member 3 so as to secure the socket 4 and the member 3 rigidly together. Alternatively, the flange 31 of the socket 4 may be omitted, the projections 28 being then attached directly to the reciprocating member 3, the latter having socket 4 attached to it by other means.

It is to be understood that although it is usual, as above stated, in the known construction of crankless machines of the class referred to, to attach the socket to the reciprocating member and to mount the slipper universally in the socket so that it is free to make sliding contact with the slant, it is possible to interchange the respective positions and functions of the two members. This possibility was pointed out in the specification of the Patent 1,409,057 above cited.

It will be clear that the mechanism described in the present invention, serving as it does essentially for the prevention of rotation of each of these members relatively to the other, is applicable to either of these alternative constructions.

I claim:

1. In a slipper-member and a socket-member universally jointed to each other and together serving for the interconversion of rotary and reciprocating motion, a plurality of projections arranged in series around the axis of one of said members and severally engaging with a like number of recesses arranged in a corresponding series on the other of said members so as to prevent rotation of each of said members about the axis of the other.

2. In a slipper-member and a socket-member according to claim 1, projections having the shape of conical frustra arranged in annular series on one of said members said conical projections engaging severally with recesses arranged in corresponding annular series on the other of said members.

3. In a slipper-member and a socket-member according to claim 1, projections having the shape of conical frustra arranged in annular series on one of said members and having their axes arranged on a cone whose vertex is at the centre of the universal joint of the two members, said conical projections engaging severally with recesses arranged in corresponding annular series on the other of said members.

4. In a slipper-member and a socket-member according to claim 1, a slipper-member comprising a plate element, a ball element and an annular series of pins whose inner portions serve to attach the said plate-element and ball-element to each other and whose outer portions engage severally with recesses arranged in corresponding series on the socket-member.

5. In a slipper-member and a socket-member according to claim 1, a slipper-member comprising a ball element and a plate-element having its centre of mass substantially on the axial line of the slipper perpendicular to the plate-element, said slipper-member having projections arranged in annular series and engaging severally with recesses arranged in corresponding series on the socket-member.

6. A slipper member and socket member universally jointed to each other and together serving for the inter-conversion of rotary and reciprocating motion, a plurality of radially disposed projections arranged upon one of the members in an annular series from a circumferential line parallel with the face of the slipper member and offset from the center of said slipper member, severally engaging with a like number of recesses arranged in a corresponding annular series on the other member so as to prevent rotation of each of said members about the axis of the other.

ANTHONY GEORGE MALDON MICHELL.